United States Patent [19]
Hegler

[11] Patent Number: 6,045,347
[45] Date of Patent: Apr. 4, 2000

[54] APPARATUS FOR THE PRODUCTION OF PLASTIC COMPOUND PIPES

[76] Inventor: Ralph Peter Hegler, Schillerstrasse 7, D-97688 Bad Kissingen, Germany

[21] Appl. No.: 08/934,349

[22] Filed: Sep. 19, 1997

[30] Foreign Application Priority Data

Oct. 4, 1996 [DE] Germany ............................ 196 40 928

[51] Int. Cl.[7] ................................................... B29C 47/90
[52] U.S. Cl. .................................... 425/133.1; 425/192 R; 425/233; 425/336; 425/379.1; 425/392; 425/396
[58] Field of Search ............................... 425/133.1, 192 R, 425/378.1, 379.1, 233, 326.1, 336, 392, 395, 396; 264/171.26, 171.27, 173.12, 173.16

[56] References Cited

U.S. PATENT DOCUMENTS

| | | | |
|---|---|---|---|
| 3,221,371 | 12/1965 | Stevens . | |
| 3,570,062 | 3/1971 | Dukert et al. | 425/326.1 |
| 3,609,809 | 10/1971 | Slicker | 425/192 R |
| 4,136,143 | 1/1979 | Lupke et al. | 425/396 |
| 4,846,660 | 7/1989 | Drossbach | 425/326.1 |
| 5,320,797 | 6/1994 | Hegler et al. | 425/133.1 |
| 5,346,384 | 9/1994 | Hegler et al. | 425/381 |
| 5,466,402 | 11/1995 | Lupke | 264/39 |
| 5,472,659 | 12/1995 | Hegler et al. | 264/508 |

FOREIGN PATENT DOCUMENTS

| | | |
|---|---|---|
| 0208055B2 | 1/1987 | European Pat. Off. . |
| 3701822C2 | 6/1989 | Germany . |
| 4010404A1 | 10/1990 | Germany . |
| 2911833C3 | 7/1994 | Germany . |
| 4325021C1 | 3/1995 | Germany . |
| WO 94/09964 | 5/1994 | WIPO . |

*Primary Examiner*—Harold Pyon
*Assistant Examiner*—Joseph Leyson
*Attorney, Agent, or Firm*—Robert F. I. Conte; Lee Mann Smith McWilliams Sweeney & Ohlson

[57] ABSTRACT

An apparatus for the production of plastic compound pipes has a pipe head and half shells completing each other in pairs to form a mold. The pipe head has a supporting ring, which is joined to a connecting piece of an extruder by a first adjusting device. Hereby the width of an injection channel can be modified over its circumference. Between the supporting ring and an external nozzle jacket, a second adjusting device is provided, by which the width of an external channel is adjustable over its circumference.

18 Claims, 3 Drawing Sheets

APPARATUS FOR THE PRODUCTION OF PLASTIC COMPOUND PIPES

BACKGROUND OF THE INVENTION

1. Field of the Invention

The invention relates to an apparatus for the production of plastic compound pipes.

2. Background Art

An injection head for an apparatus for the production of plastic compound pipes with exterior transverse grooves is known from DE 29 11 833 C3, in which an intermediate pipe is provided in an injection channel, having an upstream cutting edge for dividing a flow of melt and succeeding guide surfaces. In this way, the flow of melt is divided into flows enclosing each other concentrically. For identical speed of discharge of these two flows of melt from a downstream internal nozzle or from a downstream external nozzle to be reached, heating and/or cooling devices are provided. This is meant to render possible in particular the working of PVC into compound pipes which have a smooth interior pipe and corrugated exterior pipe. In this known apparatus, it cannot be avoided that the interior pipe and/or the corrugated exterior pipe of the compound pipe have a varying wall thickness over the circumference.

An apparatus for the production of compound pipes of the generic type is known from EP 208 055 B2, in which the injection head comprises an internal channel and an external channel. The width of the external channel can be modified externally over the circumference by means of a set collar. The width of the internal channel can be modified externally by the internal mandrel being adjusted by means of screws. As a prerequisite of the adjustability of the internal mandrel, the entire system must be strongly braced axially for leakage to be avoided. As a result, high adjusting forces are necessary. If leakage occurs in spite of this, then the melt flowing out of the internal channel streams inwards where it is burnt. This gives rise to considerable cleaning problems.

An apparatus for the production of compound pipes is known from U.S. Pat. No. 5,346,384, the injection head of which comprises a nozzle body to which, among other things, an external nozzle jacket is attached by means of an adjusting device. By means of this adjusting device, this external nozzle jacket can be adjusted radially to the centrally longitudinal axis so that the width of the external channel defined by this external nozzle jacket can be adjusted over the circumference of the external channel in such a way that a melt hose emerges from a downstream external nozzle that has a constant thickness over its circumference. In particular in the production of compound pipes of greater diameters, corresponding adjustment of the flow of melt that produces the interior pipe of the compound pipe is not possible.

The prospectus "Rollepaal" of the company of Machinefactory 'De Rollepaal' bv of 7701 Dedemsvaart, the Netherlands, teaches to provide ultrasonic wall-thickness-measuring devices for the production of compound pipes. When the pipe wall thickness deviates from a given desired value, centering of the hose forming the pipe takes place in the nozzle by means of heatings, the effect typical of PVC being utilized, namely that the sliding behavior of the PVC melt on a wall, and thus the throughput of the melt through the nozzle, strongly depends on the wall temperature.

SUMMARY OF THE INVENTION

It is the object of the invention to embody an injection head for an apparatus of the generic type in such a way that compound pipes can be produced by it, the interior pipe and the exterior pipe of which have a constant wall thickness over their circumference.

This object is attained by an apparatus for the production of plastic compound pipes, in which half shells are disposed to circulate in the direction of production, completing each other in pairs to form a mold on a molding path, a pipe head of an extruder being disposed upstream of the molding path in the direction of production, comprising a central longitudinal axis; a connecting piece of the extruder; a supporting ring; a first adjusting device, by means of which the connecting piece and the supporting ring are tightly joined to each other in the direction of the axis, and by means of which the supporting ring is adjustable relative to the connecting piece radially to the axis; an internal mandrel mounted on the supporting ring; an external mandrel mounted on the supporting ring and surrounding the internal mandrel; an external nozzle jacket surrounding the external mandrel; a second adjusting device, by means of which the external nozzle jacket and the supporting ring are tightly joined to each other in the direction of the axis, and by means of which the external nozzle jacket is adjustable relative to the supporting ring radially to the axis; an annular injection channel formed between the connecting piece and the supporting ring and connected with the extruder; an internal channel, which discharges from the injection channel, which is led through the supporting ring in the direction of production, and which is subsequently defined between the internal mandrel and the external mandrel and terminates in an internal nozzle; and an external channel, which discharges from the injection channel, which is led through the supporting ring in the direction of production, and which is subsequently defined between the external mandrel and the external nozzle jacket and terminates in an external nozzle.

The working mechanism is such that by regulation of the first adjusting device, the injection channel is centered between the connecting piece and the nozzle body in such a way that a flow of melt streams in the internal channel, transporting the same quantity of melt per time unit over the entire circumference so that a hose emerges from the internal nozzle which has the same wall thickness over its entire circumference. If, upon adjustment of the first adjusting ring, the melt streaming in the external channel does not form such a uniform hose, the centering of the external channel can be modified by corresponding adjustment of the external nozzle jacket in such a way that a hose emerges from the external nozzle of the external channel which exhibits the same wall thickness over its entire circumference. The regulations carried out by means of the second adjusting device do not influence the flow of melt in the internal channel which is adjusted by means of the first adjusting device. The two adjustment jobs by means of the first adjusting device and the second adjusting device can take place one after the other while production goes on. Should leakage occur, any leaking melt would flow outwards with the result that such leakage would be noticed immediately, there being no soiling of the pipe head.

Thermal centering can be used in particular in the case of comparatively great pipe diameters and when PVC is used as a melt.

Further features, details and advantages of the invention will become apparent from the ensuing description of an exemplary embodiment, taken in conjunction with the drawing.

DESCRIPTION OF THE PREFERRED EMBODIMENT

Figure 1:
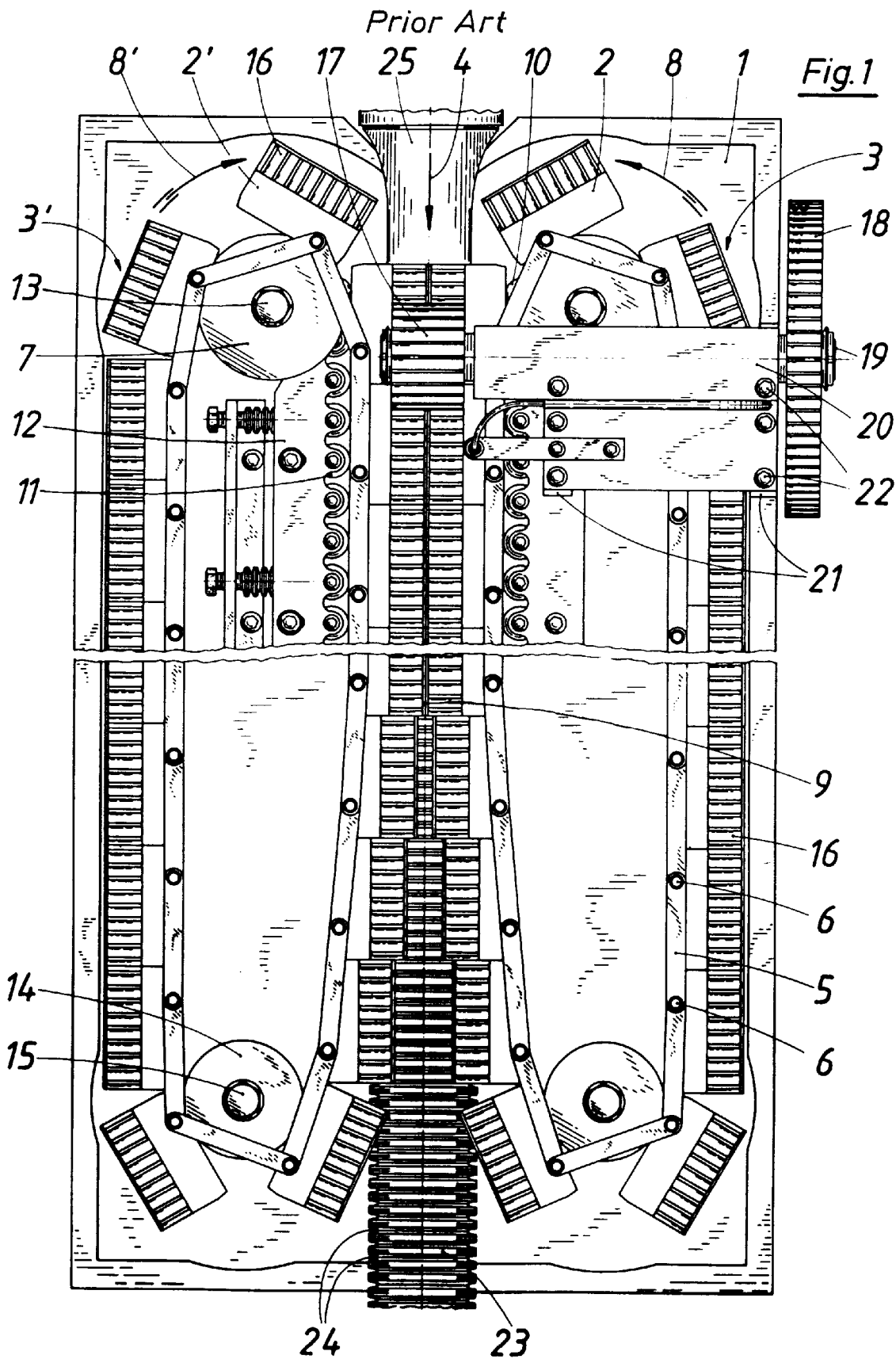
FIG. 1 is a plan view of an apparatus for manufacturing plastic pipes.

As seen in FIG. 1, the apparatus for the production of plastic compound pipes with transverse grooves comprises a machine bed 1, on which half shells 2, 2' are arranged, which are joined together in two so-called chains 3, 3', respectively. For this purpose, a fish-plate 5 is coupled by means of a coupling bolt 6 to each half shell 2, 2' in the outer region thereof and downstream thereof with respect to the direction 4 of production, each fish-plate 5 being attached to the succeeding half shell 2, 2' at the corresponding position by means of another coupling bolt 6. The chains 3, 3' thus formed, at their rear end with respect to the direction 4 of production, are guided around guide wheels which serve as and may be designated feed rollers 7. The individual half shells 2, 2' are swung into a molding path 9 by the revolution of the chains 3, 3' in the direction of the arrows 8, 8'. In this path 9, two half shells 2, 2' at a time are united to a half shell pair, so that an unbroken succession of pairs of half shells mutually abut in the direction 4 of production. In order to achieve rapid closure of the half shells 2, 2' into a parallel and adjoining orientation, so-called closing rollers 10 are provided, which, referred to the direction 4 of production, bring the rear ends of the half shells 2, 2' together in accelerated fashion.

In the molding path 9 itself, the mutually abutting half shells 2, 2' are pressed together by means of guide rollers 11, which are rotatably mounted in guide rails 12. The feed rollers 7 are rotatably mounted on the machine bed 1. Referred to the direction 4 of production, return rollers 14, likewise serving as guide wheels, are rotatably mounted on axle bearings 15, around which the chains 3, 3' are guided and returned to the feed rollers 7. As can be seen in FIG. 1, the guide rails 12 with the guide rollers 11 terminate after the length of several half shells 2, 2' and before the return rollers 14, so that the half shells 2, 2' can be displaced away from each other transversely of the direction 4 of production while remaining parallel to each other, before they are guided around the return rollers 14.

On the upper side of the half shells 2, 2', provision is made for a set of teeth 16, and the two sets of teeth 16 of the half shells 2, 2', which are arranged in abutting pairs, match each other so that a common pinion 17 can engage in the teeth 16, and push the half shells 2, 2' along the molding path 9 as a closed mold. This drive pinion 17 is conventionally driven by a motor (not shown) through a drive gear wheel 18 which is fixedly mounted on a shaft 19, the shaft in turn carrying the drive pinion 17. The shaft 19 is housed in a bearing 20, which is set apart from the machine bed 1 by means of spacing pieces 21 and firmly fixed in relation to the machine bed 1 by means of screws 22.

In the illustrated apparatus, plastic pipes 23, namely so-called compound pipes, are produced, having among other things transverse profile features, i.e. grooves 24 extending around their girth.

When the expression was used that the half shells 2, 2' are disposed on a machine bed 1, this is meant to imply that quite generally, they are guided and displaceable in some way in a machine bed.

For the production of the pipes, an extruder is provided, of which only the pipe head 25, to be described in detail in the following, is shown, the pipe head 25 being the injection head of the extruder.

The pipe head 25 is secured to a connecting piece 27 of the extruder (not shown) by means of a first adjusting ring 26. It has a substantially annular supporting ring 28, to which all the essential parts of the pipe head are secured. Concentrically of a common central longitudinal axis 29 of the pipe head 25, this supporting ring has an annular collar 30 projecting in the direction 4 of production. An internal mandrel 32 is secured within this annular collar 30 by means of an internal thread connection 31. An external mandrel 34 is attached on the outer circumference of the annular collar 30 by means of an external thread connection 33. Finally and again concentrically of the axis 29, an external nozzle jacket 35 is attached to the supporting ring 28 by means of a second adjusting ring 36.

Figure 2:
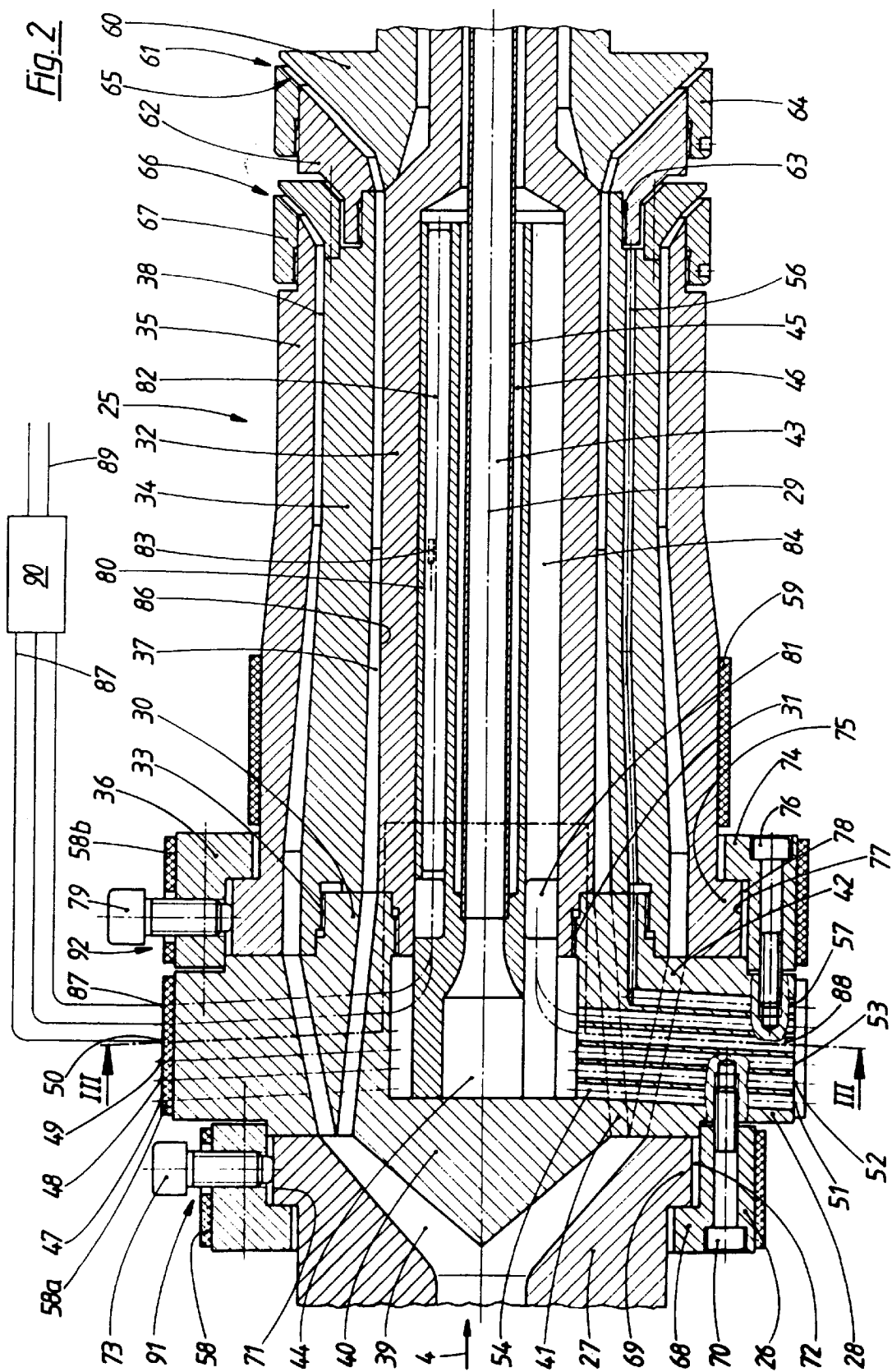
FIG. 2 is a vertical longitudinal section through the injection head of the apparatus in accordance with the line II—II of FIG. 3.

The internal mandrel 32 and the external mandrel 34 define between them an internal channel 37, while the external mandrel 34 and the external nozzle jacket 35 define between them an external channel 38. The internal channel 37 and the external channel 38 are connected to an annular and expanding injection channel 39 coming from the extruder—as seen in FIG. 2. So as to attain a continuous flow of the plastic melt from the extruder into the channels 37, 38, a torpedo 40 is arranged on the supporting ring 28 and directed into the injection channel 39 against the direction 4 of production. The internal channel and the external channel pass through the supporting ring 28 as far as to the injection channel 39.

In the supporting ring 28, the internal channel 37 is interspersed by radially extending internal webs 41 and the external channel 38 is interspersed by external webs 42 equally extending radially relative to the axis 29, so that the supporting ring 28 is really one piece. As can be seen from FIG. 2, the internal channel 37 in the supporting ring 28 extends through the annular collar 30.

The internal mandrel 32 is provided with a line conduit 43 extending concentrically of the axis 29 and opening into a chamber 44 in the supporting ring 28. In this line conduit 43, a protecting tube 45 is arranged concentrically of the axis 29 and is surrounded by an air gap 46. The protecting tube 45 itself is made from steel.

Supply hoses 47, 48, 49, 50, 51, 52, 53 (roughly outlined) are piloted through the protecting tube 45 in the line conduit 43. They are guided radially from outside through the supporting ring 28 into the latter's chamber 44, to which effect approximately radially extending bores 54 reaching right into the chamber 44 are provided, which of course intersperse the external webs 42 and the internal webs 41, so that the hoses 47 to 53 do not contact the melt transported in the channels 37 and 38. The hoses 47 to 53 are made of high-temperature-resistant plastic material such as polytetrafluoroethylene.

In the external mandrel 34, gas ducts 56 are formed, extending in the direction 4 of production and connected to a supply channel 57 in the supporting ring 28, which extends approximately radially to the axis 29 and passes through the web 42. Along a major part of its length, the pipe head 25 is surrounded by heatings 58, 58a, 58b, 59, so that cooling down of the melt coming from the injection channel 39 and flowing through the channels 37, 38 is avoided.

An internal mandrel disk 60 expanding in the shape of a truncated cone is arranged on the internal mandrel 32 and bears an internal mandrel formed as a temperature-regulating bell. On the side located inwards radially to the axis 29, this internal mandrel disk 60 delimits an internal nozzle 61 finishing the internal channel 37. On the external mandrel 34, an extension piece 62 is arranged by means of a thread connection 63 and, seen in the direction 4 of production, partially surrounds the internal mandrel disk 60, thus surrounding an extended portion of the internal channel 37 on the outside, namely as far as right ahead of the internal nozzle 61. On the side located radially outwards, the latter is surrounded by an internal nozzle ling 64 arranged on the extension piece 62.

The internal nozzle ring 64 is in the form of a sleeve and has a nozzle limiting face 65 expanding in the shape of a truncated cone in the direction of production and delimiting the internal nozzle 61.

Further, provision is made for an external nozzle 66, which terminates the external channel 38 and which is defined by an external nozzle ring 67 embodied in the same way as the internal nozzle ring 64.

As far as described above, the apparatus is known from U.S. Pat. No. 5,346,384. As for the adjustment of the internal nozzle 61 and the external nozzle 66 and regarding the design of a calibrating mandrel adjoining the internal mandrel disk, reference is made to U.S. Pat. No. 5,346,384.

The first adjusting ring 26, which is disposed before the supporting ring 28 in the direction 4 of production, comprises an annular collar 68 projecting radially to the axis 29 and overlapping an annular flange 69 of the connecting piece 27. The first adjusting ring 26 is screwed to the supporting ring 28 by means of screws 70 that are parallel to the axis 29, whereby the pipe head 25 is tightly united with the connecting piece 27 in the direction of the axis 29. A gap 72 is provided between the first adjusting ring 26 and the periphery 71 of the annular flange 69. Further, adjusting screws 73 are provided in the adjusting ring 26, which are disposed radially to the axis 29 and which bear against the periphery 71. By corresponding setting of the adjusting screws 73, the supporting ring 28 can be regulated relative to the connecting piece 27 radially to the axis 29.

The second adjusting ring 36, which is disposed downstream of the supporting ring 28 in the direction 4 of production, is structured in the same way as the first adjusting ring 26, i.e. it has an annular collar 74 projecting inwards radially to the axis 29 and overlapping an annular flange 75 of the external nozzle jacket 35. It is tightly joined to the supporting ring 28 by means of screws 76, whereby the external nozzle jacket 35 is tightly joined to the supporting ring 28 in the direction of the axis 29. An annular gap 78 is formed between the periphery 77 of the annular flange 75 and the adjusting ring 36. As seen in particular in FIG. 3, adjusting screws 79 are disposed in the adjusting ring 36, which are regularly angled radially to the axis 29 and bear against the periphery 77. By setting these adjusting screws 79, the external nozzle jacket 35 is oriented radially to the axis 29 and thus relative to the supporting ring 28.

The arrangement of the adjusting screws 73 at equal angles is the same as the arrangement of the adjusting screws 79.

Figure 3:
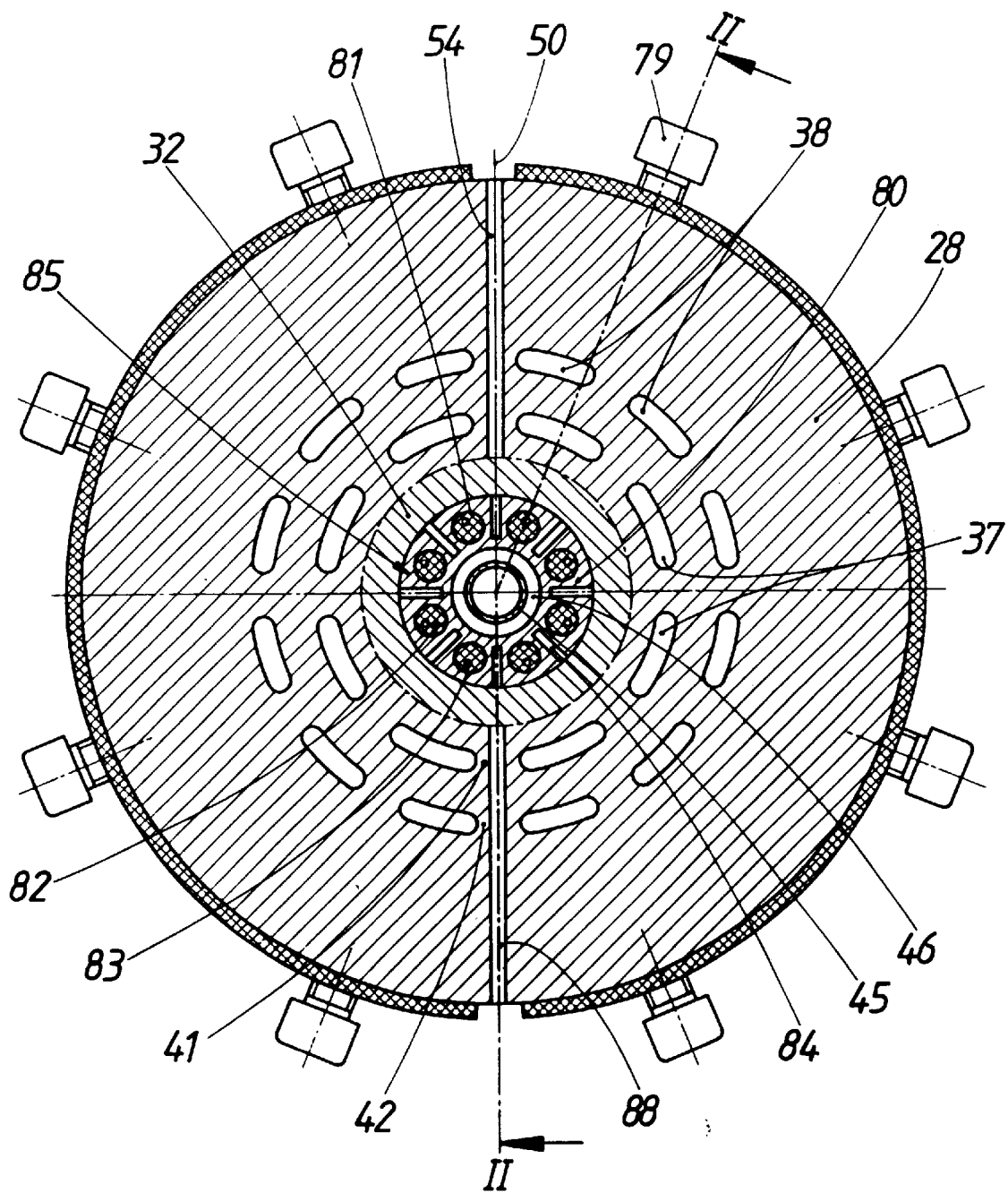
FIG. 3 is a cross-section through the injection head in accordance with the line III—III of FIG. 2.

A heating supporting pipe 80 is disposed between the protecting tube 45 and the internal mandrel 32; it supports the protecting tube 45, delimits the air gap 46 relative to the latter, and supports itself on the internal mandrel 32. As seen in FIGS. 2 and 3, it comprises lengthwise bores 81, which extend parallel to the axis 29 and in which electric heating cartridges 82 are disposed, extending over a substantial part of the internal mandrel 32. Temperature sensors 83 are mounted on each of these heating cartridges 82, measuring the temperature in the vicinity of the heating cartridges 82.

In the exemplary embodiment illustrated, provision is made, according to FIG. 3, for eight heating cartridges 82 at regular angles, which consequently extend over an angular measure of 45° each. Neighboring heating cartridges 82 are separated from each other by air gaps 84 serving for insulation and extending radially to the axis 29. In this way, heating segments 85 are formed, which are substantially thermally insulated from each other. By means of these heating segments 85, the internal mandrel 32 outer wall, which forms an inner wall 86 of the internal channel 37, can be heated at temperatures that vary over the circumference.

For electrical power supply of the heating cartridges 82, electric lines 87 are provided, which are guided through corresponding bores 88 in the supporting ring 28. These bores 88 extend—same as the bores 54—through the external webs 42 and the internal webs 41. In the same way, temperature-measuring lines 89 are led outwards. The measuring lines 89 are led to inlets of a control unit 90. The electric lines 87 lead from outlets of the control unit 90 to the heating cartridges 82.

The first adjusting ring of the design specified, in which it comprises the adjusting screws 73, forms a first adjusting device 91. The second adjusting ring 36 of the design specified, in which it comprises the adjusting screws 79, forms a second adjusting device 92. By the adjusting screws 73 being set, the first adjusting device 91 selves to regulate the entire pipe head 25 inclusive of the supporting ring 28 relative to the connecting piece 27 radially to the axis 29 in such a way that the width of the conically expanding injection channel 39, which is defined inwards by the torpedo 40, is modified. This adjustment takes place in such a way that the melt coming from the extruder streams over the entire periphery of the internal channel 37 such that the hose discharged through the internal nozzle 61 has a uniform thickness over its entire circumference. This interior hose constitutes the smooth-walled interior pipe of the compound pipe 23. If, after this adjustment, the melt hose emerging from the external nozzle 66 exhibits irregular thickness over its circumference, then the external nozzle jacket 35 is regulated radially to the axis 29 by means of the second adjusting device until the hose from the external nozzle 66 has a thickness uniform over the circumference and the corrugated exterior pipe of the compound pipe 23 has a thickness uniform over the circumference.

In particular in the case of greater nominal widths and a melt of polyvinyl chloride, thermal centering by means of the heating segments 85 can be performed additionally. By surface temperatures of the inner wall 86 that vary over the periphery, melt sliding properties are obtained that vary over the periphery of the internal channel 37. At a higher temperature the PVC melt slides more easily, i.e. rapidly, which means that there is a comparatively increased flow of melt per time unit in the vicinity of the heating segment 85 heating at a higher temperature. These physical circumstances can also be used for compensation of differences in wall thickness of the hose discharged through the internal nozzle 61.

What is claimed is:

1. An apparatus for the production of plastic compound pipes, in which half shells are disposed to circulate in a direction of production, completing each other in pairs to form a mold on a molding path, a pipe head of an extruder being disposed upstream of the molding path in the direction of production, comprising a central longitudinal axis;
a connecting piece of the extruder;

a supporting ring;

a first adjusting device, by means of which the connecting piece and the supporting ring are tightly joined to each other in the direction of said axis, and said first adjusting device being able to adjust the supporting ring relative to the connecting piece radially to said axis, said first adjusting device has a first adjusting ring provided with an annular collar which overlaps an annular flange of the connecting piece and wherein the first adjusting ring is joined to the supporting ring;

an internal mandrel mounted on the supporting ring;

an external mandrel mounted on the supporting ring and surrounding the internal mandrel;

an external nozzle jacket surrounding the external mandrel;

a second adjusting device, by means of which the external nozzle jacket and the supporting ring are tightly joined to each other in the direction of said axis, said second adjusting device being able to adjust the external nozzle jacket relative to the supporting ring radially to said axis, said second adjusting device has a second adjusting ring provided with an annular collar which overlaps an annular flange of the external nozzle jacket and wherein the second adjusting ring is joined to the supporting ring;

an annular injection channel formed between the connecting piece and the supporting ring and connected with the extruder;

an internal channel which discharges from the injection channel and which is led through the supporting ring in the direction of production, and which is subsequently defined between the internal mandrel and the external mandrel and terminates in an internal nozzle; and an external channel which discharges from the injection channel and which is led through the supporting ring in the direction of production, and which is subsequently defined between the external mandrel and the external nozzle jacket and terminates in an external nozzle.

2. An apparatus for the production of plastic compound pipes, in which half shells are disposed to circulate in a direction of production, completing each other in pairs to form a mold on a molding path, a pipe head of an extruder being disposed upstream of the molding path in the direction of production, comprising a central longitudinal axis;

a connecting piece of the extruder;

a supporting ring;

a first adjusting device, by means of which the connecting piece and the supporting ring are tightly joined to each other in the direction of said axis, and by means of which the supporting ring is adjustable relative to the connecting piece radially to said axis, said first adjusting device has a first adjusting ring provided with an annular collar which overlaps an annular flange of the connecting piece and wherein the first adjusting ring is joined to the supporting ring by means of screws, and wherein the first adjusting ring is provided with first radial adjusting means which are disposed radially to said axis and which bear against a periphery of the connecting piece for adjustably radially setting the supporting ring relative to the connecting piece;

an internal mandrel mounted on the supporting ring;

an external mandrel mounted on the supporting ring and surrounding the internal mandrel;

an external nozzle jacket surrounding the external mandrel;

a second adjusting device, by means of which the external nozzle jacket and the supporting ring are tightly joined to each other in the direction of said axis, and by means of which the external nozzle jacket is adjustable relative to the supporting ring radially to said axis;

said second adjusting device has a second adjusting ring provided with an annular collar which overlaps an annular flange of the external nozzle jacket and wherein the second adjusting ring is joined to the supporting ring by means of screws and the second adjusting ring is provided with second radial adjusting means which are disposed radially to said axis and which bear against a periphery of the external nozzle jacket for adjustably radially setting the external nozzle jacket relative to the supporting ring;

an annular injection channel formed between the connecting piece and the supporting ring and connected with the extruder;

an internal channel which discharges from the injection channel and which is led through the supporting ring in the direction of production, and which is subsequently defined between the internal mandrel and the external mandrel and terminates in an internal nozzle; and an external channel which discharges from the injection channel and which is led through the supporting ring in the direction of production, and which is subsequently defined between the external mandrel and the external nozzle jacket and terminates in an external nozzle.

3. The apparatus of claim 2 wherein the first radial adjusting means comprises adjusting screws.

4. The apparatus of claim 3 wherein the second radial adjusting means comprises adjusting screws.

5. An apparatus according to claim 2, wherein the injection channel (39) expands in the direction (4) of production.

6. An apparatus according to claim 3, wherein the adjusting screws (73) of the first adjusting ring (26) bear against a periphery (71) of the annular flange (69) of the connecting piece.

7. An apparatus according to claim 4, wherein the adjusting screws (79) of the second adjusting ring (36) bear against a periphery (77) of the annular flange (75) of the external nozzle jacket.

8. An apparatus for the production of plastic compound pipes, in which half shells are disposed to circulate in a direction of production, completing each other in pairs to form a mold on a molding path, a pipe head of an extruder being disposed upstream of the molding path in the direction of production, comprising a central longitudinal axis;

a connecting piece of the extruder;

a supporting ring;

a first adjusting device, by means of which the connecting piece and the supporting ring are tightly joined to each other in the direction of said axis, and by means of which the supporting ring is adjustable relative to the connecting piece radially to said axis;

an internal mandrel mounted on the supporting ring;

heating segments are disposed in the internal mandrel, which extend parallel to said axis, which are thermally insulated from each other and are heatable individually;

an external mandrel mounted on the supporting ring and surrounding the internal mandrel;

an external nozzle jacket surrounding the external mandrel, a second adjusting device, by means of which the external nozzle jacket and the supporting ring are tightly joined to each other in the direction of said axis, and by means of which the external nozzle jacket is adjustable relative to the supporting ring (28) radially to said axis;

an annular injection channel formed between the connecting piece and the supporting ring and connected with the extruder;

an internal channel which discharges from the injection channel and which is led through the supporting ring in the direction of production, and which is subsequently defined between the internal mandrel and the external mandrel and terminates in an internal nozzle; and an external channel which discharges from the injection channel and which is led through the supporting ring in the direction of production, and which is subsequently defined between the external mandrel and the external nozzle jacket and terminates in an external nozzle.

9. An apparatus according to claim 8, wherein the heating segments (85) are formed in a heating supporting pipe (80) with lengthwise bores (81), in which electric heating cartridges (82) are disposed.

10. An apparatus according to claim 9, wherein air gaps (84) are formed between two neighboring heating cartridges (82), extending radially to said axis (29).

11. An apparatus according to claim 8, wherein each heating segment (85) is provided with at least one temperature sensor (83).

12. An apparatus according to claim 8, wherein the injection channel expands in said direction of production.

13. An apparatus according to claim 8, wherein the first adjusting device comprises a first adjusting ring provided with an annular collar which overlaps an annular flange of the connecting piece and wherein the first adjusting ring is joined to the supporting ring by means of screws.

14. An apparatus according to claim 8 wherein the second adjusting device comprises a second adjusting ring provided with an annular collar which overlaps an annular flange of the external nozzle jacket and wherein the second adjusting ring is joined to the supporting ring by means of screws.

15. An apparatus according to claim 13, wherein the first adjusting ring is provided with adjusting screws which are disposed radially to said axis and which bear against a periphery of the connecting piece.

16. An apparatus according to claim 14 wherein the second adjusting ring is provided with adjusting screws which are disposed radially to said axis and which bear against a periphery of the external nozzle jacket.

17. An apparatus according to claim 15 wherein the adjusting screws of the first adjusting ring bear against a periphery of the annular flange.

18. An apparatus according to claim 16, wherein the adjusting screws of the second adjusting ring bear against a periphery of the annular flange.

* * * * *